Jan. 1, 1957 A. P. IANUZZI 2,776,152
BALL AND SOCKET JOINTS
Filed Oct. 18, 1950 2 Sheets-Sheet 2
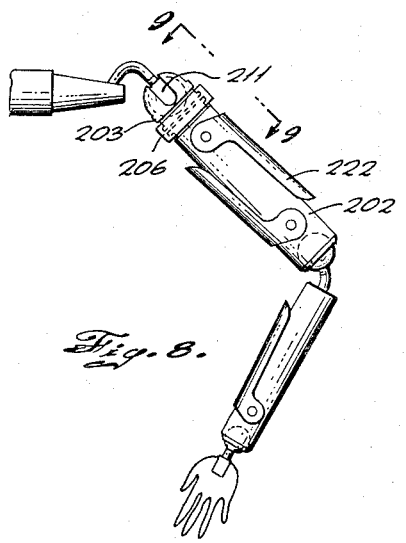
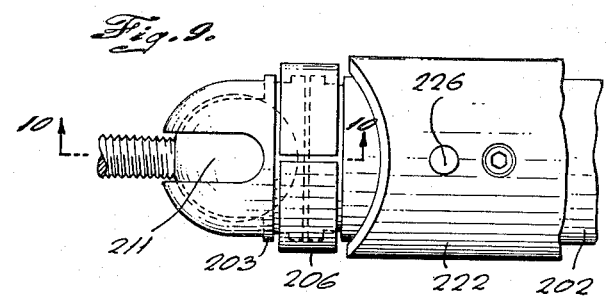
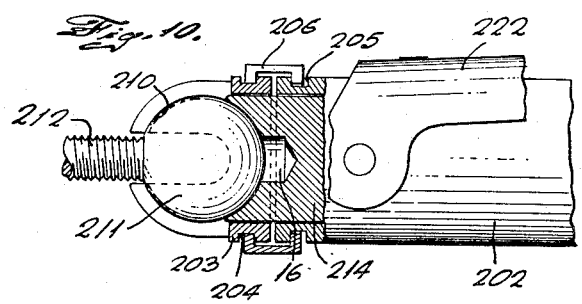
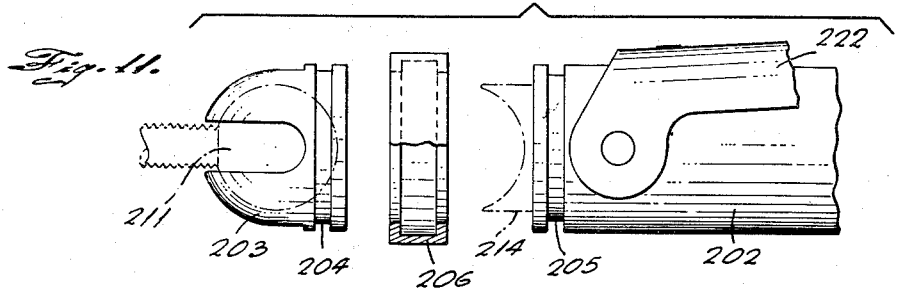
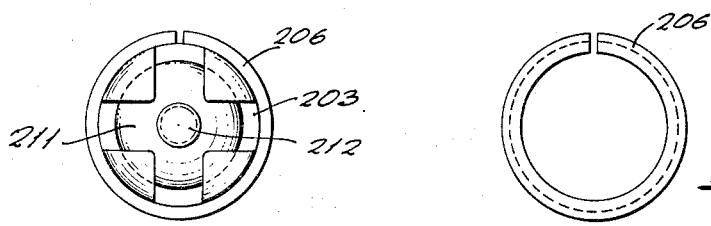
INVENTOR.
ANTHONY P. IANUZZI
BY
ATTORNEY

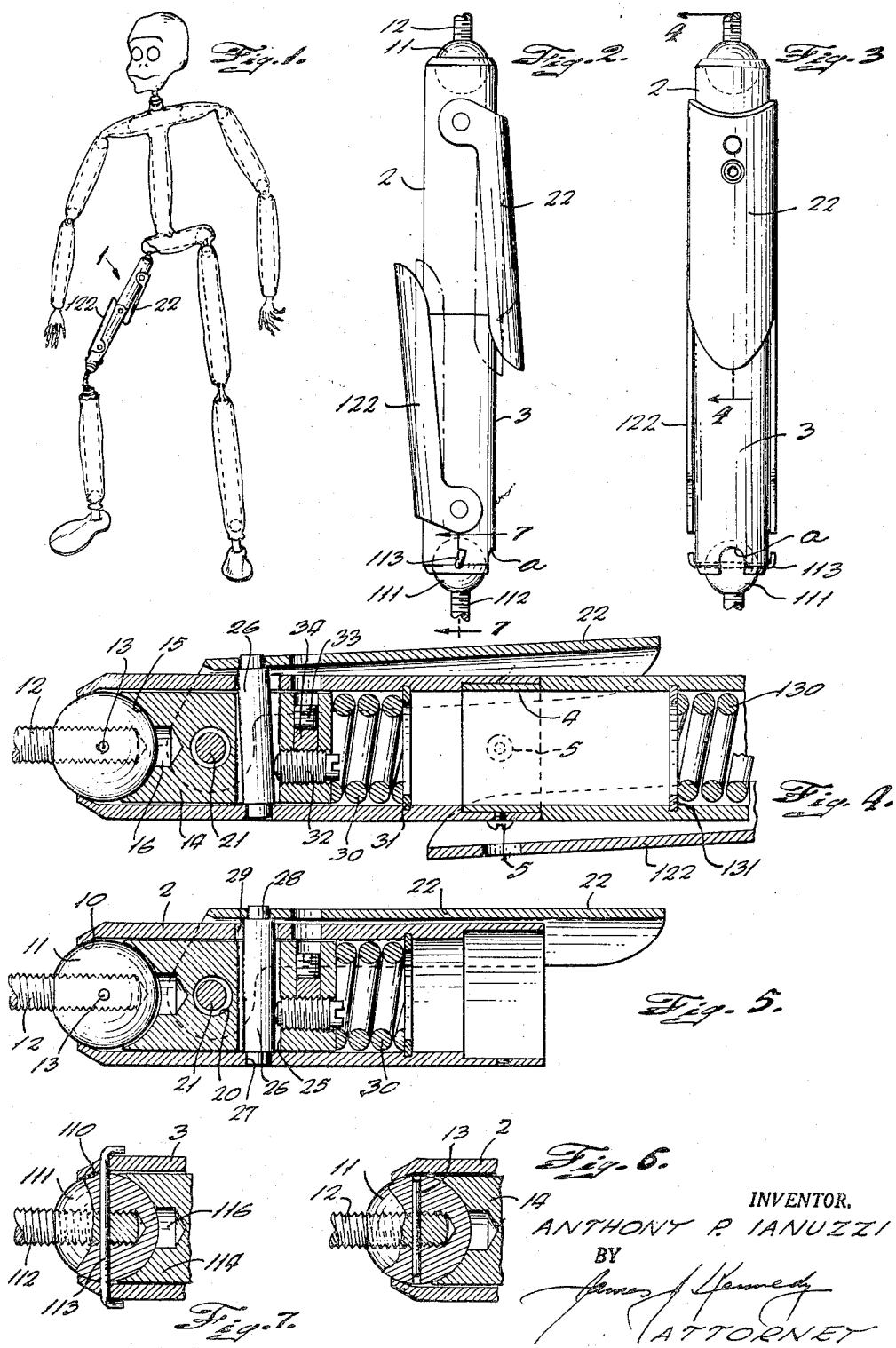

United States Patent Office 2,776,152
Patented Jan. 1, 1957

2,776,152

BALL AND SOCKET JOINTS

Anthony P. Ianuzzi, Hollis, N. Y.

Application October 18, 1950, Serial No. 190,740

2 Claims. (Cl. 287—12)

This invention relates to improvements in joints.

More particularly, the invention is concerned with providing a joint or hinge of the type used in puppets or lay figures.

It is an object of the invention to provide a hinge or joint which is easily or accurately adjusted and locked in adjusted position.

It is a further object of the invention to provide a joint having locking and release mechanism operable by pressure exerted against a member, such as the limb of a lay figure, so that the joint may be operated through any padding, clothing or other covering which may be present.

With the foregoing and still other objects which will appear in the following description in mind, the invention consists in the combinations and arrangements of parts and details of construction which will now first be fully described with reference to the accompanying drawing and then be more particularly pointed out in the appended claims.

In the drawing:

Figure 1 is a schematic elevation of a lay figure embodying the invention in a preferred form, the outer covering of the right thigh being removed to show interior mechanism;

Figure 2 is an enlarged elevational view showing the thigh, hip and knee joints of the figure of Figure 1;

Figure 3 is a view similar to Figure 2, but looking from a different direction;

Figure 4 is an enlarged section on the line 4—4 of Figure 3;

Figure 5 is a view similar to Figure 4, showing the mechanism in a different position;

Figure 6 is a section of one end of the mechanism of Figures 4 and 5, the section plane being at right angles to the plane of those figures;

Figure 7 is a view similar to Figure 6, but showing the knee joint construction;

Figure 8 is a view on an enlarged scale with the left shoulder and arm of the figure of Figure 1 with outer covering removed to show internal construction;

Figure 9 is an enlarged elevation view looking in the direction of the arrows 9—9 of Figure 8;

Figure 10 is a view partly in elevational and partly in section on the line 10—10 of Figure 9;

Figure 11 is an exploded view of the device of Figure 9 with parts shown in section;

Figure 12 is an end elevation of the joint of Figure 9; and

Figure 13 is an elevational view of the retainer ring.

Figure 1 illustrates schematically a lay figure, the outer covering being removed between the right hip and knee to show the skeleton or armature construction. The hip joint, Figures 2-6, illustrates the invention as applied to a universal joint, while the knee joint illustrates the invention as applied to a joint pivoted for movement in a single plane. The primary intended use for the figures constructed according to the invention is in making motion pictures, this being accomplished by shooting one frame at a time and moving the figure slightly between shots so as to create the desired motion. The feet may be held down magnetically or in any desired manner on the set, and it is essential that such joints as the knee and ankle joints be capable of holding the figure in any desired position while permitting easy and nice adjustment in small increments between frames for accomplishing the desired action. As will be apparent, the figure need not be human, but may be any desired real or fanciful animate creature or even inanimate object having relative movement of its parts.

The thigh structure chosen for purposes of illustration comprises a generally tubular body 1, made up of two sections 2 and 3, and articulated to the pelvis and skin structures by the joints of the invention. The bone 1 may be formed in any convenient manner, as, for example, by forming a reduced end 4 on element 3 and corresponding socket on element 2 and holding the elements together by set screws 5.

Element 2 has a partial seat 10 formed in its end for receiving the ball 11. The seat 10 may conform to the ball 11 or may be conical or convenience of manufacture. Ball 11 forms the hip joint, being attached to the pelvis by screw threaded shank 12 which is screwed into the ball as shown and held by a pin 13 as indicated in Figures 4 and 6. Plunger 14, slidable in the bore of the tubular element 2, is formed with a spherical seat 15, relieved along its axis by a counterbore. Seat 15 may be lapped for accurate fit.

A cross bore 20 in the plunger 14 accommodates pivot pin 21 for the operating lever 22 with sufficient clearance to permit all required movements of the plunger. The pivot pin 21 extends through bores in the element 2 and lever 22, these bores being preferably reamed for accurate fit.

A second cross bore 25 accommodates operating pin 26 with clearance sufficient to permit the required movements. Pin 26 has reduced ends, as indicated, one end fitting in a bore 27 in the element 2 and the other fitting in a bore 28 in lever 22. Opening 29 in element 2 accommodates the pin 26 with clearance. Bores 27 and 28 fit the reduced ends of pin 26 with sufficient clearance to allow the small movement of the pin as described below, and with ball 11 of one-half inch diameter and other parts in proportion a clearance of one-hundredth of an inch or so will be sufficient.

Plunger 14 is urged toward ball 11 by spring 30 thrusting against a split washer 31 snapped into a groove inside element 2, but set screw 32 engaging pin 26 serves to limit movement of the plunger. Screw 32 is carried in a threaded bore as indicated and is held in adjusted position by a second set screw 33 carried in a threaded cross bore and compressing a lead plug 34 against the screw 32.

Prior to assembly of elements 2 and 3 together, and with the parts in the position of Figure 5, the set screw 32 is adjusted until the required frictional resistance (if any) to turning of the ball 11 is obtained. In a joint of the size indicated, the spring may exert a force of about two hundred pounds and it will be apparent that by adjusting screw 32 the entire spring load may be placed on pin 26 or any desired friction may be placed on ball 11. Normally the screw 32 will be set so that the spring load is carried entirely by pin 26 but the slightest turn of the screw will transfer the load to ball 11. The screw 32 having been adjusted and locked in position by turning screw 33, the joint is ready for use.

Spring 30 tends to rock the pin 26 about its end carried in bore 27 (counterclockwise in the figure) and the pressure of the other end of the pin 26 produces a turning moment (counterclockwise) of lever 22 about its pivot 21. In consequence, the parts will normally assume a position such as indicated in Figure 4. In this position, the upper end of pin 26 will have moved over slightly, a movement of the order of less than a hundredth of an inch being sufficient, and plunger 14 will have been permitted to move until the entire spring force is applied to the ball 11, locking it against turning with sufficient force to sustain all normal loads. The plunger movement need be only one or two thousandths of an inch.

Where movement in only one plane is desired, the construction shown in Figures 2, 3 and 7 for the knee joint may be used. The mechanism in general may be identical, and since corresponding parts are indicated by similar reference numerals increased by 100, the description of these parts will not be repeated. The pin 113 is carried through bores in the member 3 and turned over at its ends as indicated, forming a pivot shaft for the ball 111. To increase the arc of turn possible, the end of member 3 may be cut out as indicated at *a* to accommodate the shank 112, permitting about 135° pivotal movement which is ordinarily all that is desired. Pin 113 should pass through member 3 with enough clearance so as not to take the pressure of spring 130 in any position of adjustment.

The ankle and wrist joints (Figure 8) may be constructed similarly to the hip joint described above and the elbow joint may be similar to the knee joint. It is desirable to provide for increased movement of the shoulder joint and for this purpose the joint construction shown in Figures 8–12 is adopted. In the joint there shown, the tubular element 202, corresponding generally to the element 2 previously described, is provided together with operating lever 222, plunger 214 and similar associated internal parts, which being the same as those previously described require no further description.

A socket 210 is, however, formed on a separate member 203. This member has a circumferential groove at 204 and the end of the member 202 is similarly grooved at 205. A split retainer ring 206 is snapped into place, as indicated in the figures, and holds the tip 203 on the member 202. The member 203 is slotted as best indicated in Figures 11 and 12, the two slots extending at right angles to each other and providing for 180° hinging movement in two planes at right angles to each other. The ball 211 is similar in construction to the ball 11 previously described and is gripped and held in the same manner. In addition to the complete freedom of hinging movement in the two planes, the construction provides for a full 360° of turn about the axis of the member, since the snap ring holding the elements 202 and 203 together permits unlimited turning of the one with respect to the other about the axis of the member.

The members 16 and 116 in the plunger seating surfaces serve as pockets for holding a supply of abrasive to increase the friction between plunger and ball and improve the locking effect. Any suitable abrasive may be utilized, and ordinary household cleaning powders, such as "bon ami" have been found very satisfactory.

The various constructions disclosed may be combined and modified in any desired manner to suit particular conditions and additional articulation, as, for example, in the back bone may be provided wherever found desirable. In adjusting the figure for the successive poses, the operator takes hold of the members to each side of a joint, presses the lever 22 or 122 controlling the joint in question to release the lock, moves the desired member and releases the pressure, locking the member adjusted in desired position. Since there is no resistance to the movement, a very nice adjustment may be had, and the adjusted parts will remain securely in adjusted position. Practically any desired padding or clothing may be used on the figure without interfering with operation of the lever 22 or 122 by pressure applied to the outer surface of the figure.

What is claimed is:

1. In a device of the character described, and in combination, a pair of members and a hinge joining the same, the hinge comprising a ball attached to one of the members, the other member having a tubular portion terminating in an inwardly turned rim forming a seat for holding the ball, a plunger within the tubular portion and a spring for urging it against the ball to lock the same against pivotal movement, a cross piece extending across the tubular portion, means pivotally mounting one end of the cross piece in the wall of the tubular member, an operating lever for moving the other end of the cross piece axially of the member, the tubular portion having an aperture accommodating the said other end of the cross piece and the said other end extending out beyond the barrel and being connected to the operating lever, the plunger abutting against the cross piece whereby it is normally permitted to press against the ball for locking the same but is forced back to release the ball upon movement of the operating arm.

2. In a device of the character described, and in combination, a pair of members and a hinge joining the same, the hinge comprising a ball attached to one of the members, the other member having a tubular portion terminating in an inwardly turned rim forming a seat for holding the ball, a plunger within the tubular portion and a spring for urging it against the ball to lock the same against pivotal movement, a cross piece extending across the tubular portion, means pivotally mounting one end of the cross piece in the wall of the tubular member, an operating lever for moving the other end of the cross piece axially of the member, the tubular portion having an aperture accommodating the said other end of the cross piece and the said other end extending out beyond the barrel and being connected to the operating lever, an adjustable member attached to the plunger and abutting against the cross piece whereby the plunger is normally permitted to press against the ball for locking the same but is forced back to release the ball upon movement of the operating arm.

References Cited in the file of this patent

UNITED STATES PATENTS

| | | |
|---|---|---|
| 353,504 | Rodes | Nov. 30, 1886 |
| 357,337 | Rosenblatt | Feb. 8, 1887 |
| 420,969 | Seaman | Feb. 11, 1890 |
| 675,106 | Oberle | May 28, 1901 |
| 804,387 | Davis | Nov. 14, 1905 |
| 852,872 | Collins | May 7, 1907 |
| 1,127,099 | Shipley | Feb. 2, 1915 |
| 1,291,237 | Sturrock | Jan. 14, 1919 |
| 1,435,182 | Shaw | Nov. 14, 1922 |
| 1,572,770 | Colley | Feb. 9, 1926 |
| 1,800,797 | Hoople | Apr. 14, 1931 |
| 2,107,095 | Wagner | Feb. 1, 1938 |
| 2,394,494 | Schwinn | Feb. 5, 1946 |
| 2,418,315 | Presser | Apr. 1, 1947 |
| 2,424,499 | Pasturczak | July 22, 1947 |
| 2,425,665 | Arden | Aug. 12, 1947 |
| 2,638,298 | Peterson | |

FOREIGN PATENTS

| | | |
|---|---|---|
| 339,415 | Germany | July 25, 1921 |
| 356,961 | Italy | Feb. 23, 1938 |
| 448,756 | Germany | Aug. 27, 1927 |
| 635,561 | France | of 1927 |
| 702,369 | France | Jan. 20, 1931 |